Oct. 12, 1948.  W. C. HEATH ET AL  2,451,285

EXHAUST STRUCTURE FOR RESILIENTLY MOUNTED ENGINES

Filed Dec. 3, 1943

INVENTORS
PAUL A. PITT
WM. C. HEATH
BY
E. Woodbury
ATTORNEY.

Patented Oct. 12, 1948

2,451,285

UNITED STATES PATENT OFFICE 2,451,285

EXHAUST STRUCTURE FOR RESILIENTLY MOUNTED ENGINES

William C. Heath and Paul A. Pitt, San Diego, Calif., assignors to Solar Aircraft Company, San Diego, Calif., a corporation of California Application December 3, 1943, Serial No. 512,814

3 Claims. (Cl. 138—51)

This invention relates to exhaust systems for aeroplane engines and the like in which different portions of the system are subject to severe relative vibration, and a broad object of the invention is to provide a durable and economical system in which the necessary freedom of motion is permitted without introducing excessive leakage of exhaust gas.

Briefly, we achieve this object by interconnecting the relatively movable portions of the system with short lengths of flexible metal hose of known type consisting of overlapping, interlocking turns and commonly referred to as flex tubing.

When exhaust manifolds were first introduced for use on aeroplane engines, it was customary to bolt the manifold directly to the engine so that it moved as a unit therewith. However, as aeroplane engines of larger power came into use, it was found desirable to mount the engine to the aeroplane frame with resilient supports so as to permit a substantial amount of free vibration of the engine relative to the aeroplane. Because of the increased absolute vibration of the engine resulting from the flexible mounting and the details of fitting the manifold to the engine and the aeroplane, it was no longer feasible, in many instances, to rigidly anchor the manifold to the engine for vibration therewith. Instead, the manifold was mounted on the aeroplane frame, and it became necessary to connect the manifold to the cylinders of the engine with flexible branch pipes.

To those unskilled in the art, it might appear obvious to use flex tubing for these branch pipes between the engine and the manifold. On the contrary, to the best of our knowledge, those responsible for the development of these systems considered that flex tubing was unsuitable for exhaust installations involving flexure in service. Thus, for example, it is stated in United States patent to Fulton 1,476,704, disclosing an automobile exhaust pipe of flex tubing, that it is suitable for that use only because it is not flexed in operation, but only at the time it is installed. Hence, to the best of our knowledge, aeronautical engineers dismissed flex tubing as not even worthy of a trial for aeroplane exhaust connections and concentrated their efforts on the development of flexible joints of the ball and socket type.

Because of this universal acceptance of the impression (now known to be erroneous) that flex tubing would not be satisfactory under conditions of constant vibration, it was only after long continued insistence, and after the shortcomings of ball and socket joints had made the problem acute, that we were able to have tests made on flex tubing for such service. However, as a result of such tests, we have established that flex tubing of suitable materials has a service life in excess of the best ball and socket type joints known to us. It has the further advantage of costing only a small fraction of the cost of ball and socket joints and of involving less fire hazard, while being comparable as to weight and leakage, with the best ball and socket joints. Flex tubing connections involve less fire hazard than ball and socket connections for the reason that when a ball and socket joint fails, it usually opens up entirely, often permitting exhaust gas of extremely high temperature to impinge directly on adjacent inflammable materials. On the other hand, when a flex tubing joint fails, the failure is usually very gradual, in the form a helical split that gives warning, so that the tubing can be replaced before it ruptures completely.

A full understanding of the invention may be had from the following detailed description which refers to the drawing, in which:

Fig. 4 is a detail view of the packing employed in the tubing of Fig. 2.

Figure 1:
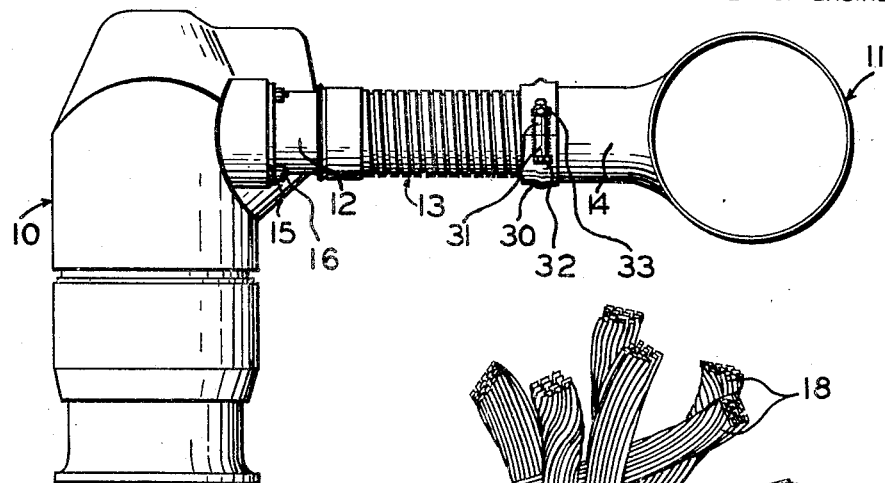
Fig. 1 is a view showing schematically a cylinder of a resiliently supported engine connected to a manifold by a flexible connection in accorance with the invention.

Referring first to Fig. 1, there is indicated schematically the cylinder 10 of an aeroplane engine resiliently supported for vibratory motion from the frame of an aeroplane (not shown) and an exhaust manifold 11 which is in spaced relation to the cylinder 10 and supported independently of the engine so that there is relative vibratory motion between the cylinder 10 and the manifold 11. The engine of which cylinder 10 forms a part may be of radial type, the plane of which is perpendicular to the plane of the drawing, and the manifold 11 may be of annular form in a plane parallel to but spaced axially from the plane of the engine.

Each cylinder 10 of the engine is connected to the manifold 11 by an exhaust duct comprising an exhaust nipple 12 secured to the cylinder, a flex tubing connector 13 and a branch pipe 14 extending from and formed integrally with the manifold 11. The nipple 12 may have a flange 15 formed integrally therewith, which flange is secured to the cylinder 10 by studs and nuts 16.

In the particular construction shown, the left end of the flex tubing connector 13 forms a slip connection with the nipple 12 and the right end is clamped to the branch pipe 14. The flex tubing connector 13 may be of either packed or unpacked type.

Figures 2, 3:
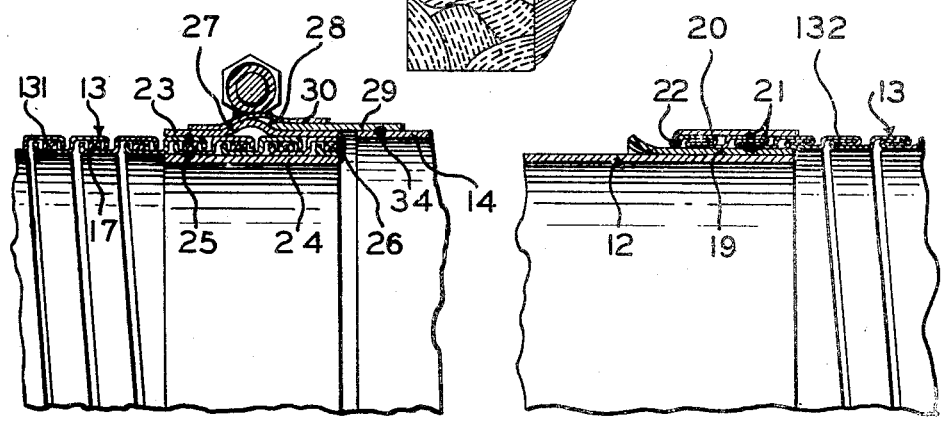
Fig. 2 is a detail section showing the construction of a packed flex tubing and the connection thereof to the manifold.
Fig. 3 is a detail section showing the construction of an unpacked tubing and its connection to the engine.

The construction of a suitable packed flex tubing is illustrated in Fig. 2 in which it will be observed that it consists of a helical strip 131 so configured that the edges of adjacent turns overlap each other and contain therebetween a continuous helical packing 17 which may be formed of heat and corrosion-resistant twisted and woven strand material. A suitable material is "Inconel" which is an alloy comprising approximately 79% nickel, 13% chromium and the balance largely iron.

Referring to Fig. 4, it will be observed that the packing is formed from a plurality of twisted strands 18 of relatively fine "Inconel" ribbon. Thus the ribbon may be formed by rolling .004 inch "Inconel" wire into flat form. These strands 18 are then woven together and the resultant braid pressed into substantially square cross sectional shape somewhat thicker than the space provided between the overlapping turns of the flex tubing so that at the time the latter is formed, the packing is squeezed from the square shape shown in Fig. 4 to the oblong shape shown in Fig. 2.

The flex tubing itself may be formed of a suitable heat and corrosion-resistant metal or alloy such as "Inconel" or stainless steel. Very satisfactory results have been had with stainless steel containing approximately 18% chromium, 8% nickel and the balance chiefly iron, with a small amount of titanium or columbium to stabilize it.

Referring again to Fig. 2, the right end of the tubing is terminated with an outer collar 23 and and inner sleeve 24 which may be spot welded to the flex tubing as indicated at 25 and are also joined together and to the flexible tubing by a ring of weld metal 26. It is intended, however, that the right end of the tubing be secured rigidly to the branch pipe 14 of the manifold, and to this end the outer collar 23 is provided with an annular external ridge 27 against which the flared end 28 of a sleeve 29 rests and is secured in place by a split clamp 30 which has welded to its opposite ends a pair of apertured lugs 31 which are drawn together by a bolt 32 and nut 33. The flared sleeve 29 telescopes with the branch pipe 14 and may be spot welded thereto as indicated at 34.

Referring now to Fig. 3, there is shown a suitable construction of unpacked flex tubing in which the adjacent turns 132 of the helical strip composing the tubing are folded back on each other to provide a relatively tortuous path for leakage gas, while providing axial freedom of motion between adjacent turns. This tubing, like that of Fig. 2, may be of any suitable heat and corrosion-resistant material such as "Inconel" or stainless steel.

The left end of the flex tubing 13 is secured to an interior flared wear sleeve 19 and an exterior reinforcing collar 20, both of which may be of stainless steel. The wear sleeve 19 slidably engages the nipple 12 on the engine cylinder so that it can slip thereon, both longitudinally and circumferentially, to reduce the purely longitudinal strains applied to the flex tubing so that the latter has only to absorb lateral flexure. The wear sleeve 19 and reinforcing collar 20 may be joined to the flex tubing by spot welds, as indicated at 21 and by a circumferential fillet of weld metal 22 in accordance with the procedure described and claimed in copending application Serial No. 512,744, filed December 3, 1943, now Patent No. 2,420,153, dated May 6, 1947, in the names of Harold A. Sprenger and Joseph R. Greene, and entitled "Flexible exhaust conduit assembly and method of making it."

A packed hose is shown in Fig. 2 and an unpacked tubing in Fig. 3 simply to reduce the number of drawings required, it being understood that in practice the connector 13 will consist of either packed or unpacked tubing, but not both.

The helical strips 131 and 132 forming the flex hose may be relatively thin, of the order of .018, thereby making the total weight of the connection relatively low. Despite the thinness of the material, such tubing has a life in vibrational service far exceeding the life that would be normally expected from experience with flexible joints of the ball and socket type.

Various departures from the exact construction shown in the drawing may be had while still employing the essential features of the invention as set forth in the appended claims.

We claim:

1. In an exhaust system of an internal combustion engine: a pair of spaced conduit members separately supported for relative vibratory motion and a flexible conduit interconnecting said two members, said flexible conduit consisting of a helical element, successive turns of which overlap and interlock in sliding relation with each other, the connection between said flexible conduit and one of said members including a slip joint providing free rotational and longitudinal movement of the flexible conduit relative to said one member.

2. A flexible exhaust connection for interconnecting a pair of spaced conduit members separately supported for relative vibratory motion, said connection comprising: a flexible conduit consisting of a helical element successive turns of which overlap and interlock in sliding relation with each other, in combination with a pair of coupling means for coupling opposite ends of said flexible conduit to said respective spaced conduit members, one of said coupling means including a slip joint providing free rotational and longitudinal movement of one end of said flexible conduit and thereby substantially eliminating rotational and longitudinal stresses between opposite ends of said flexible conduit.

3. A connection as described in claim 2 in which the length of said flexible conduit is less than four times its diameter.

WILLIAM C. HEATH.
PAUL A. PITT.

REFERENCES CITED

The following references are of record in the file of this patent:

UNITED STATES PATENTS

| Number | Name | Date |
|---|---|---|
| 1,096,513 | Lombardi | May 12, 1914 |
| 1,811,816 | Blake | June 23, 1931 |
| 2,119,369 | Twining | May 31, 1938 |
| 2,242,604 | Wells | May 20, 1941 |
| 2,281,195 | Jacobs | Apr. 28, 1942 |
| 2,289,596 | Seamons et al. | July 14, 1942 |
| 2,295,907 | Lewis | Sept. 15, 1942 |

FOREIGN PATENTS

| Number | Country | Date |
|---|---|---|
| 24,104 | Great Britain | Oct. 31, 1907 |
| 8,969 | Great Britain | July 9, 1886 |
| 737,033 | France | Sept. 27, 1932 |
| 59,106 | Austria | Dec. 1912 |
| 3,920 | Denmark | 1900 |

OTHER REFERENCES

Publication, "Engineering Alloys," by Woldman & Dornblott, published by American Society for Metals, Cleveland, Ohio. (Copy available in Div. 3.)

Publication, "Book of Stainless Steels," by Thum, 2nd edition, published by American Society for Metals, Cleveland, Ohio. (Copy available in Div. 3.)